(12) United States Patent
Van Lierop

(10) Patent No.: US 12,517,344 B2
(45) Date of Patent: Jan. 6, 2026

(54) MEMS-MIRROR DEVICE, LIDAR DEVICE AND VEHICLE COMPRISING A LIDAR DEVICE

(71) Applicant: VLC Holding B.V., Weert (NL)

(72) Inventor: Hendrikus Wilhelmus Leonardus Antonius Maria Van Lierop, Weert (NL)

(73) Assignee: VLC HOLDING B.V., Weert (NL)

( * ) Notice: Subject to any disclaimer, the term of this patent is extended or adjusted under 35 U.S.C. 154(b) by 450 days.

(21) Appl. No.: 18/095,331

(22) Filed: Jan. 10, 2023

(65) Prior Publication Data
US 2023/0221544 A1    Jul. 13, 2023

(30) Foreign Application Priority Data

Jan. 11, 2022  (EP) ..................................... 22151034

(51) Int. Cl.
*G02B 26/08*    (2006.01)
*G02B 26/10*    (2006.01)
*G01S 7/481*    (2006.01)

(52) U.S. Cl.
CPC ....... *G02B 26/0841* (2013.01); *G02B 26/101* (2013.01); *G01S 7/4817* (2013.01)

(58) Field of Classification Search
CPC  G02B 26/0841; G02B 26/101; G02B 26/105; G02B 26/0833; G01S 7/4817;
(Continued)

(56) References Cited

U.S. PATENT DOCUMENTS 4,317,611 A    3/1982  Petersen
9,588,337 B2   3/2017  Van Lierop et al.
(Continued)

FOREIGN PATENT DOCUMENTS

JP   2003-057575 A    2/2003
WO   2009/044331 A2   4/2009

OTHER PUBLICATIONS

International Search Report dated Oct. 6, 2021, issued in International Patent Application No. PCT/NL2021/050430 (2 pgs.).
(Continued)

*Primary Examiner* — Euncha P Cherry
(74) *Attorney, Agent, or Firm* — Pillsbury Winthrop Shaw Pittman, LLP

(57) ABSTRACT

A MEMS-mirror device (1) is provided that comprises a support (2), a mirror body (3) that is rotationally suspended with respect to the support along a rotation axis (4), and an actuator (7A,7B) to induce a rotation in the mirror body around the rotation axis. The mirror body (3) has a mirror surface (311) that in a neutral state defines a reference plane (x, y) having a longitudinal axis (y) through a center of the mirror body parallel to the rotation axis (4) and a lateral axis (x) transverse to the longitudinal axis. The mirror body (3) has a central portion (31) and integral therewith a pair of extension portions (32A, 32B) that extend in mutually opposite directions along the longitudinal axis. Each of the extension portions (32A, 32B) is flexibly coupled at a lateral side (322A, 322B) to the support with a respective plurality (6A, 6B) of torsion beams (61) which in a neutral state of the mirror body extend in the reference plane (x, y). The torsion beams of a respective plurality of torsion beams have a respective first end (611) attached to the support and a respective second end (612) attached to the respective extension portion, wherein the respective first end and the respective second end have mutually different positions (y1, y2) in the direction of the longitudinal axis (y) and in the lateral direction (x) are at mutually opposite sides (x1, x2) of the rotation axis (4).

20 Claims, 8 Drawing Sheets

(58) Field of Classification Search
CPC ............ B81B 3/0045; B81B 2201/033; B81B 2201/042; B81B 2203/0172; B81B 2203/058
See application file for complete search history.

(56) References Cited

U.S. PATENT DOCUMENTS

| | | |
|---|---|---|
| 2005/0045727 A1 | 3/2005 | Fu |
| 2007/0242342 A1 | 10/2007 | Fu |
| 2010/0296146 A1 | 11/2010 | Krastev et al. |
| 2014/0300942 A1 | 10/2014 | Van Lierop et al. |
| 2015/0036203 A1 | 2/2015 | Nitsche et al. |
| 2019/0361223 A1 | 11/2019 | Albert et al. |
| 2020/0310110 A1 | 10/2020 | Carminati |
| 2021/0396990 A1* | 12/2021 | Bella .................. G02B 26/0841 |

OTHER PUBLICATIONS

Written Opinion of the International Searching Authority dated Oct. 6, 2021, issued in International Patent Application No. PCT/NL2021/050430 (6 pgs.).

Extended European Search Report mailed Jun. 28, 2022, issued in corresponding European Patent Application No. 22151034.0 (6 pgs.).

* cited by examiner

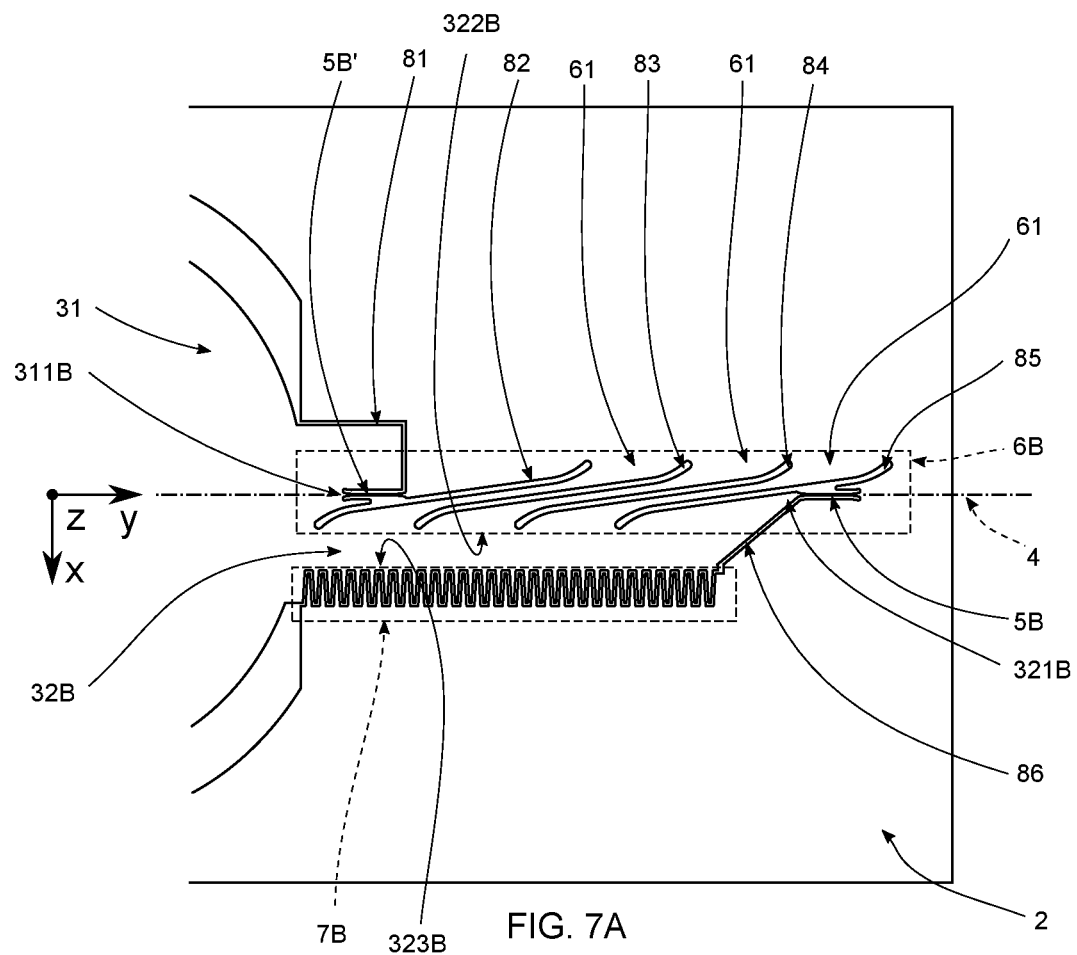
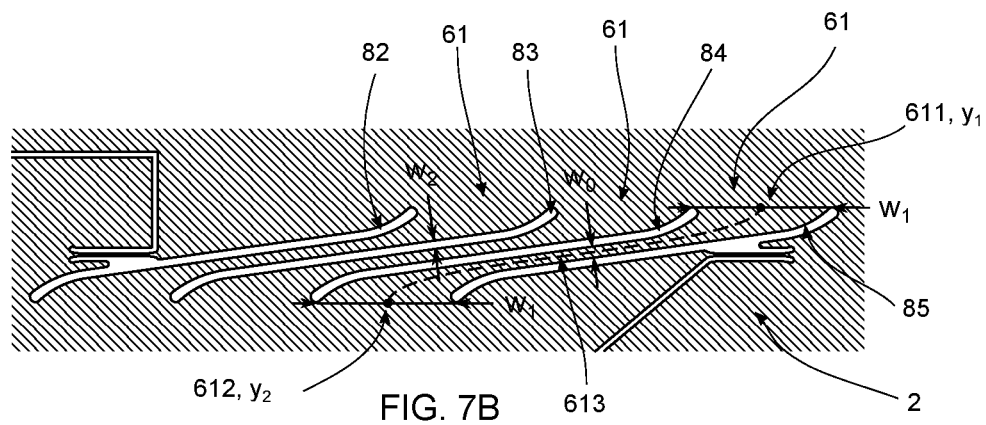

MEMS-MIRROR DEVICE, LIDAR DEVICE AND VEHICLE COMPRISING A LIDAR DEVICE

CROSS-REFERENCE TO RELATED APPLICATIONS

This application claims priority to European Patent Application No. EP 22151034.0, filed Jan. 11, 2022, the contents of which are herein incorporated by reference in its entirety.

The present application pertains to a MEMS (Micro Electro Mechanical Systems)-mirror device.

The present application further pertains to a LIDAR device comprising a MEMS-mirror device.

The present application still further pertains to a vehicle comprising a LIDAR device.

BACKGROUND OF THE INVENTION

MEMS scanning mirrors are being used in many different applications, including medical diagnostics, projection of video, laser printing, and light detection and ranging (LIDAR). They are being used to steer visible or invisible light into different directions, for example to address multiple points along a line, to illuminate a 2D surface, or to scan a 3D volume. The MEMS scanning mirror may comprise at least one rotation axis.

LIDAR is used in automotive applications to scan the environment of a vehicle, in order to detect the presence of objects and to measure the distance to those objects. A MEMS scanning mirror is used therein to direct a laser pulse or beam via its mirror surface towards the object, and it may also be used to collect the laser pulse or beam reflected by the object and to direct it via its mirror surface to a detector. Generally, MEMS scanning mirrors for automotive LIDAR applications need to be relatively large, relative fast, and may need to allow for a relatively large scan angle. For example, desired specifications of such a MEMS scanning mirror are a mirror diameter in a range of 2 to 10 mm, an oscillation frequency in the range of 500 Hz to 20 kHz, and a mechanical scanning angle in a range from ±10 to ±30 degrees. At the same time, the MEMS mirror must be robust enough to withstand vibrations, shocks, high and low temperatures, and have a long lifetime. This is achieved by designing the MEMS scanning mirror such that its mirror body has a low mass. A low mass leads to low acceleration forces when the mirror is exposed to shock or vibration, which again causes only low mechanical stresses in the suspension and small translations. Additionally, the mirror suspension shall have a high stiffness in all degrees-of-freedom (DOF) other than the DOF used for the scanning, to reduce the amount of translation or rotation when the mirror is exposed to shock or vibration. A low translation or rotation helps to mitigate mechanical stress, which makes the device robust. It also contributes to a high pointing accuracy, which allows the device to continue to operate when exposed to vibration or shock.

The mechanical stresses in flexible suspension members, such as leaf springs, relief springs and torsion beams must be low enough to allow for sufficiently large angle of rotation of the MEMS mirror body around the rotation axis. The lower the mechanical stress for a given rotation of the MEMS mirror body, the larger the achievable rotation angle is. A low mechanical stress may be achieved by using a low rotation stiffness for this main rotational DOF, but this will make the device less robust as the stiffness of the other DOF will also be low. The stiffnesses of the different DOFs cannot be chosen or designed completely independently. Therefore, it is desirable for the MEMS scanning mirror to also have a high stiffness for the DOF corresponding to rotation around a rotation axis, in which case it may be desirable to operate the MEMS scanning mirror in resonance.

Torsion beams may be used to accurately define the stiffness and resonance frequency corresponding to for example a rotation Ry around a desired rotation axis (parallel to the y-axis), while suppressing other undesirable motions, such as for example the rotation Rz around the z-axis (perpendicular to the mirror surface), and such as translations Tx in the X-direction, i.e. in a plane defined by the mirror surface transverse to the desired rotation axis. These motions can be suppressed by a high translational stiffness in the corresponding direction, or a high rotational stiffness around the corresponding axis. They can also be suppressed by a low inertia of the corresponding motion. Combining a high stiffness with a low inertia for any of these motions will lead to a high resonance frequency of such motion. Such motions occurring at resonance frequencies are called eigenmodes, and the corresponding resonance frequencies are called eigenfrequencies. Ideally, the eigenfrequencies of the undesirable eigenmodes are substantially higher than the eigenfrequency of the desirable mode.

The earliest known example of a MEMS scanning mirror using torsion beams is disclosed in U.S. Pat. No. 4,317,611A (Petersen/IBM, 1980). In this example, torsion beams are used as the sole connection between the mirror body and a stationary frame. Typically, one torsion beam is used on each side of the mirror body to prevent out-of-plane motions such as Tz and Rx. In case a higher torsional stiffness is desired around the rotation axis, for example to operate the MEMS mirror around the rotation axis at a specific resonance frequency, then the torsion beams may have a large cross-sectional area (perpendicular to the rotation axis). A large cross-sectional area results in a large torsional stiffness of the torsion beams. Having a large cross-sectional area also increases the stiffness for the other DOF, making the MEMS mirror more robust, more stable, and more accurate. This is very important in for example automotive applications where the MEMS mirror may be subject to strong vibrations.

When increasing the cross-sectional area of the torsion beams however, the mechanical stresses in the torsion beam will increase for any given rotation angle around the rotation axis. To prevent failure of the torsion beams, their length (in Y-direction) can be increased. This will reduce the mechanical stress and will allow for a large tilt angle, but at the same time this will reduce the stiffness in the other DOF. The design space for this type of MEMS is therefore limited as undesirable trade-offs must be made.

US20190361223A1 discloses a design that can be used to avoid such trade-off, by using multiple torsion beams in a mechanically parallel configuration in a v-shaped layout. By using multiple torsion beams (or torsional elements) in parallel (each torsion beam connecting the mirror body to a stationary frame), the total torsional (rotational) stiffness can be increased without increasing the cross-sectional area, thereby avoiding the trade-off discussed above.

The more torsion beams are being used, the larger the total torsional (rotational) stiffness, and the higher the operational frequency if the MEMS mirror is operated at resonance. This allows for a faster MEMS mirror, or for a larger MEMS mirror without compromising on the speed.

FIG. 1 shows a design as disclosed in US20190361223A1, using torsion beams laid out in a V-shape. Such a layout is beneficial to increase the eigenfrequency of the most important eigenmodes, especially when combining the four thick & long torsion beams in the V-shapes with another two thin & short support beams at the rotation axis. However, this layout requires the torsion beams in the V-shape to be off the rotation axis, which increases tensile stress and non-linearity. The source of this non-linearity lies in the distance as measured in a 3D space between the end points of the torsion beams, which distance changes with the rotation of the mirror body around the rotation axis. This change in distance leads to additional mechanical tensile stresses in the torsion beam, on top of the torsion and bending stresses. Non-linearity may lead to larger mechanical stresses, especially at larger tilt angles, may lead to coupling phenomena between the various eigenmodes, and tends to complicate control of the MEMS mirror. The further the ends of the torsion beams are away from the rotation axis, the larger the non-linearity. Additionally, it will be relatively difficult to add more torsion beams than the four already being used. Connecting the stationary ends of the torsion beams to a stationary frame or pole would require additional space, which might require moving the torsion beams even further away from the rotation axis. This may again increase the amount of non-linearity, may require the actuators to be positioned further away from the rotation axis, and may increase the die size.

SUMMARY

It is an object of the present invention to provide an improved MEMS-mirror device. In accordance with this object the improved MEMS-mirror device comprises a support, such as a frame or a substrate having poles, and a mirror body that is rotationally suspended in the support along a rotation axis. The mirror body has a mirror surface that in a neutral state defines a reference plane that has a longitudinal axis (y) through a center of the mirror body parallel to the rotation axis and a lateral axis (x) transverse to the longitudinal axis. The improved MEMS-mirror device further comprises an actuator, such as an electrostatic actuator, an electromagnetic actuator or a piezoelectric actuator to induce a rotation in the mirror body around the rotation axis. The mirror body has a central portion and has a first extension portion and a second extension portion integral therewith that extend in mutually opposite directions along the longitudinal axis. The first and the second extension portion are each flexibly coupled at a lateral side to the support with a respective plurality of torsion beams. In a neutral state of the mirror body the torsion beams extend in the reference plane. The torsion beams of a respective plurality of torsion beams have a respective first end that is attached to the support and a respective second end that is attached to the respective extension portion. The respective first end and the respective second end have mutually different positions in the direction of the longitudinal axis and in the lateral direction (x) are at mutually opposite sides (x1, x2) of the rotation axis.

The improved MEMS-mirror can be easily manufactured from a single wafer, such as a silicon-on-insulator (SOI) wafer having an upper silicon layer and a lower silicon layer, with an insulating layer between the upper silicon layer and the lower silicon layer. The number of torsion beams in a respective plurality of torsion beams can be easily adapted to scale the improved MEMS-mirror for a specific purpose. In this way the desired resonance frequency and desired mechanical stresses can be determined without compromising the frequency of the other eigenmodes. Scaling is relatively easy, due to the fact that a respective area, laterally between a respective extension portion and the support, can be portioned by slits into the desired number of slanted torsion beams. The plurality of slanted torsion beams requires very little space because the slanted torsion beams are geometrically parallel and can be densely packed. In the claimed arrangement, each individual torsion beam is centered around the rotation axis. If the end points of the torsion beams are not perfectly centered around the rotation axis, then they are at least at opposite sides of the rotation axis. Because the end points are closer to the rotation axis, the tensile stress and non-linearity are reduced, which allows for a larger scan angle, which reduces coupling between the eigenmodes, and which facilitates control of the MEMS mirror device.

Additionally, it is noted that having the torsion beams located close to the rotation axis further allows the actuators to be located close to the rotation axis. This allows exerting a rotational torque and measuring the capacitance and hence rotation of the comb drive over a large rotation angle, and allows for a smaller die size.

As noted, the respective first end and the respective second end of a torsion beam have mutually different positions in the direction of the longitudinal axis. This can for example be achieved in that the first end point of a torsion beam, where the torsion beam ends on the frame or pole, has a y-position that is closer to the central portion of the mirror than the y-position of the second end of the torsion beam. A most compact arrangement is achieved however in an arrangement wherein the y-position of the second end of the torsion beam is closer. If the second end is closer to the central portion of the mirror then the extension portions can be shorter and thinner, which reduces the mass and rotational inertia of the MEMS mirror body.

In some embodiments, of the MEMS-mirror device the mirror body is further flexibly coupled to the support by out-of-plane support beam units that at least substantially extend in a longitudinal direction. As will become apparent from examples presented in the detailed description, it is not necessarily the case that the out-of-plane support beam units exactly coincide with the rotation axis (i.e. the axis around which the mirror body actually rotates during operation), or exactly coincide with the longitudinal axis (y) through the center of the central mirror body. In practice however the out-of-plane support beam units will be arranged close to the rotation axis. Additionally, it is noted that in practice the rotation axis will be close to the longitudinal axis (y).

An out-of-plane support beam unit has one or more out-of-plane support beam elements. The one or more out-of-plane support beam elements provide for a relatively low stiffness for rotations around the rotation axis, for translation in the X-direction, and for rotation around the z-axis. They provide for a relatively high stiffness for other degrees of freedom, most importantly for the translation in Z-direction. In one embodiment, the out-of-plane support beam units comprise respective first out-of-plane support beam units that each flexibly couple a peripheral end (the end of the extension portion facing away from the central portion) of a respective one of the extension portions with the support. In other embodiments, the out-of-plane support beam units additionally or alternatively comprise respective second out-of-plane support beam units that flexibly couple a respective longitudinal side of the central portion of the mirror body with the support.

In some embodiments, the first and the second extension portion are each flexibly coupled with their respective plurality of torsion beams at the same lateral side to the support. In other embodiments, the first and the second extension portion are each flexibly coupled with their respective plurality of torsion beams at mutually opposite lateral sides to the support. It is an advantage of the latter embodiments that a point-symmetric arrangement is achieved that guarantees that the rotation axis extends through the center of the mirror body. The torsion beams on one side of the mirror device are then geometrically parallel to the torsion beams on the other side of the mirror device. Therewith a risk is mitigated that exposure of the MEMS-mirror device to shock or vibration in the Z-direction induces a rotation of the mirror body. This can also be achieved in an embodiment wherein the respective plurality of torsion beams are at the same lateral side, provided that the mirror body is further flexibly coupled to the frame or pole by first and/or second out-of-plane support beam units as specified above, and wherein the out-of-plane support beam units are displaced laterally with respect to the longitudinal axis in a direction away from a lateral side of the frame or pole where the first ends of the torsion beams are attached. The lateral distance of the out-of-plane support beam units to the longitudinal axis (y) should in that case be similar to the lateral distance of the center of mass of the mirror body to the longitudinal axis (y).

The torsion beams are attached at their ends to more rigid parts. I.e. their first end is attached to a moving part of the mirror device such as the extension bars on one end and a stationary frame or pole at the other end. At such points, where the ends of the beams are clamped, stress concentrations may exist. Stress concentrations may be caused for example by sharp corners, corners having a small radius, or by a change in layer thicknesses.

In some embodiments the first and the second end of the torsion beams have a width that is larger than a width in a central portion of the torsion beams. The increased width of the torsion beams at their ends reduces the mechanical stress, allowing for some headroom to deal with stress concentrations. In some embodiments the size of an angle between the longitudinal direction and a center line of a torsion beam at the first end and at the second end is larger than that of the angle between the longitudinal direction and the center line in a central portion of the torsion beam. This measure is particularly advantageous in combination with the measure of the beforementioned embodiment, in that this combination renders it possible that the torsion beams can be relatively wide at their ends while maintaining a dense packing. In this way an undue increase on the length of the extension portions is avoided, therewith also limiting a substantial increase in the mass and inertia of the mirror body, which includes the extension portions. Especially when the ends would be significantly wider than the center parts of the torsion beams, e.g. 3× to 6× wider, these effects would become significant. In summary, in this combined embodiment the torsion beams have an S-shape allowing them to have wider torsion beam ends therewith reducing mechanical stresses at these ends, but without strongly increasing the die size. If the center line of the torsion beam at the torsion beam ends is close to perpendicular to the longitudinal direction, then those ends (and the lateral sides are parallel to the longitudinal direction. In that case the extension portion or stationary frame can extend parallel to the longitudinal direction, without requiring some sawtooth shape of the lateral sides.

The S-shape shall not be as extremely curved as a commonly used serpentine spring, i.e. the angle between the center line of the central portion of the torsion beam and the center line of the end portion of the torsion beam shall not be too large, in order to maintain sufficient stiffness of the torsion beam in x and y direction. Preferably, that angle shall be less than 90 degrees.

It is not necessary that all torsion beams of a plurality are identical. In some embodiments at least two torsion beams of a plurality of torsion beams are mutually different by one or more of a width, a length, a thickness or an angle. For example, a more uniform distribution of stress level between the torsion beams can be achieved by individually tuning their length.

As noted, an actuator for inducing an oscillatory motion of the mirror body can be provided in various ways. In an embodiment the actuator comprises at each longitudinal side of the mirror body a respective comb actuator. A respective comb actuator is arranged at a side of the longitudinal axis that is opposite a side of the longitudinal axis where the first ends of the respective plurality of torsion beams are arranged. A respective comb actuator comprises a respective pair of mutually interdigitated combs. A first comb of the pair is part of the respective extension portion and a second comb thereof is part of the support. The respective comb actuators are arranged close to the rotation axis, which allows them to exert torque over a relatively large rotation angle. If the capacitance of the combs is used to measure the rotation angle, then the rotation angle can be measured over a large range. These are two additional benefits of having the torsion beams close to the rotation axis.

The present application further pertains to a LIDAR device comprising a MEMS-mirror device. As mentioned above, the MEMS-mirror device is suitable in many applications. The improved MEMS-mirror device as disclosed herein is of particular relevance to LIDAR-devices, as the latter are typically subject to a significant level of vibrations and mechanical shocks when applied in a vehicle.

The LIDAR-device as disclosed herein comprises:
a laser to generate a modulated laser beam;
an improved MEMS-mirror device as defined above, to dynamically deflect the modulated laser beam within a target range;
an optical sensor to detect a reflected beam originating from a reflection of the dynamically deflected modulated laser beam at an object in the target range;
a data processor to determine a distance towards the object based on a length of a time interval between a point in time at which the modulated laser beam was generated and a point in time at which the reflection thereof was detected by the optical sensor. The modulation of the laser beam enables the data processor to determine the point in time of generation of the radiation from which the reflection is received. For example, the beam is pulse wise modulated with a sufficiently long time interval between subsequent pulses. Alternatively, the beam can be modulated with a time dependent modulation pattern, so that the data processor can identify the point time of the emission of the beam from the detected modulation pattern.

The improved MEMS-mirror body is compact and therewith has a low rotational inertia, and the MEMS-mirror suspension has a high stiffness, which enable a high resonance frequency. Furthermore, a large measurable deflection angle can be achieved in embodiments having the electrostatic actuator specified above. Also, a high resistance against mechanical exposure is obtained in embodiments as specified above.

The present application still further pertains to a vehicle comprising a LIDAR device. The technical advantages of the improved MEMS-mirror and the LIDAR device comprising the same render it very suitable for application in a vehicle.

BRIEF DESCRIPTION OF THE DRAWINGS

These and other aspects of the invention are described in more detail with reference to the drawings. Therein:

FIG. 7A shows in more detail an aspect of the further embodiment in FIG. 6A, 6B;

FIG. 7B shows a portion thereof in further detail;

DETAILED DESCRIPTION OF EMBODIMENTS

Figure 1:
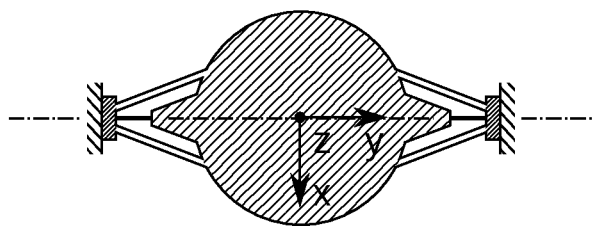
FIG. 1 shows an embodiment of a MEMS-mirror device according to the prior art.
Figure 2:
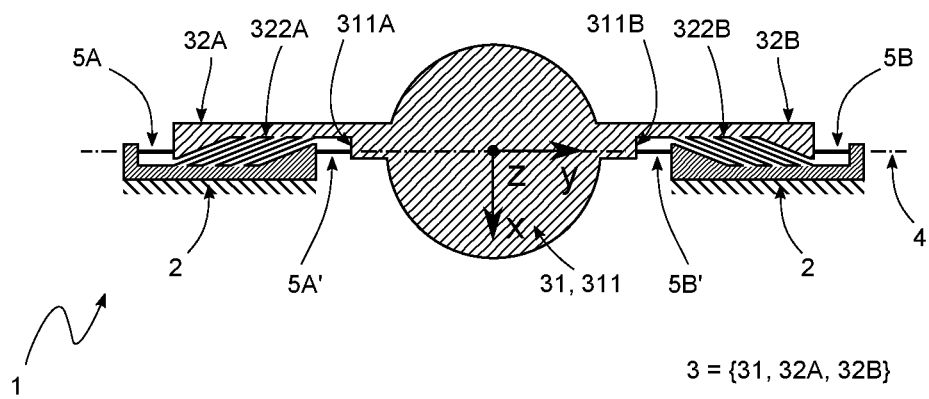
FIG. 2 shows a first embodiment of an improved MEMS-mirror device as disclosed herein.

FIG. 2 schematically shows a first embodiment of an improved MEMS-mirror device 1. The improved MEMS-mirror device 1 comprises a support, here a frame 2, and a mirror body 3 that is rotationally suspended in the frame along a rotation axis 4, which can be actuated by an actuator to induce a rotation of the mirror body around the rotation axis.

The mirror body 3 has a mirror surface 311 that in a neutral state defines a reference plane (x, y) with a longitudinal axis (y) through a center of the mirror body parallel to the rotation axis 4 and with a lateral axis (x) transverse to the longitudinal axis.

As shown in FIG. 2, the mirror body 3 has a central portion 31 and has integral therewith a first extension portion 32A and a second extension portion 32B. The extension portions extend in mutually opposite directions along the longitudinal axis.

As is further shown in FIG. 2, the first and the second extension portion 32A, 32B are each flexibly coupled at a lateral side 322A, 322B, to the frame with a respective plurality 6A, 6B of torsion beams. The first extension portion 32A has the flexible coupling at a lateral side 322A facing in the positive x-direction. In this case, the second extension portion 32B also has the flexible coupling at the lateral side 322B facing in the positive x-direction.

In a neutral state of the mirror body 3, the torsion beams extend in the reference plane (x, y). As can be seen in more detail in FIG. 5B, 5C, a torsion beam 61 has a first end 611 attached to the frame 2 and a second end 612 attached to the respective extension portion 32A. The first end and the second end have mutually different positions (y1, y2) in the direction of the longitudinal axis (y). In the example shown in FIG. 5B, 5C, this is achieved in that the y-position y2 of the second endpoint 612 is closer in the y-direction to the central portion 31 of the mirror body 3 than the y-position y1 of the first endpoint 611. A most compact arrangement is achieved by using a plurality 6A, 6B of such torsion beams.

In FIG. 2, the first extension portion 32A and second extension portion 32B are both located on the same side of the rotation axis 4. This has the advantage that the actuators 7A, 7B are also located on the same side of the rotation axis 4, which makes it easier to connect to them from the same side of the device, for example by using wire-bonding. In this embodiment the lateral sides 322A, 322B of the first and the second extension portion 32A, 32B are facing in the same positive or negative x-direction.

Figure 3:
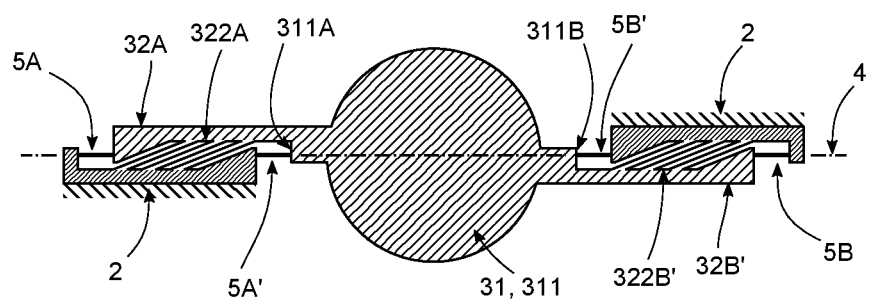
FIG. 3 shows a second embodiment of an improved MEMS-mirror device as disclosed herein.

In the embodiment of FIG. 3, the first extension portions 32A and second extension portion 32B are located at mutually opposite sides of the rotation axis 4. This has the advantage that the center of mass of the mirror body 3 is closer to the rotation axis 4, which reduces the amount of rotation of the mirror body 3 around the rotation axis 4 when the MEMS mirror device is exposed to mechanical vibration or shock in the z-direction. In this embodiment the lateral sides 322A, 322B' of the first and the second extension portion 32A, 32B' are facing in opposite x-directions.

As further shown in FIG. 2 and FIG. 3, the mirror body 3 is further flexibly coupled to the frame 2 by out-of-plane support beam units 5A, 5A', 5B, and 5B'. Preferably, at least one such out-of-plane support beam units is used at each longitudinal side of the central portion 31. These out-of-plane support beam units extend at least substantially in a longitudinal direction. These out-of-plane support beam units may connect the central portion to the frame, may connect the extension portions to the frame, or both.

Figure 4:
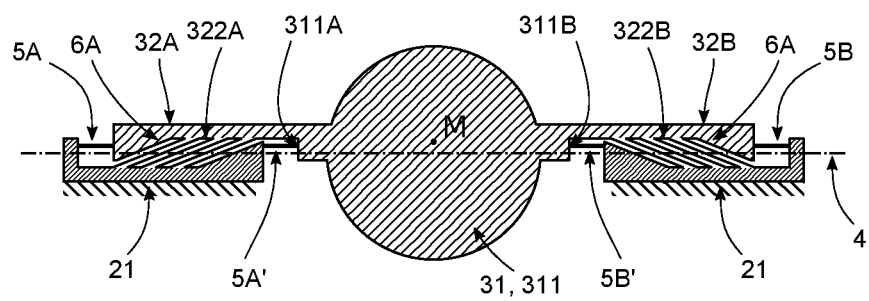
FIG. 4 shows a third embodiment of an improved MEMS-mirror device as disclosed herein.

FIG. 4 shows an embodiment of a MEMS mirror device similar to the one in FIG. 2. However, in FIG. 4 the out-of-plane support beam units are displaced laterally with respective to the longitudinal axis (y) in a direction away from a lateral side 21 of the frame 2 where the first ends of the torsion beams are attached. This has the advantage that the out-of-plane support beam units are closer in the transverse direction (x) to the center of mass M of the mirror body, which reduces the amount of rotation of the mirror body 3 around the rotation axis 4 when the MEMS mirror device is exposed to mechanical vibration or shock in the z-direction. The embodiment of FIG. 4 is also an example wherein the support beam units 5A, 5A', 5B, 5B' are near the rotation axis as indicated by the dashed line 4, or near the longitudinal axis (y), but do not coincide therewith.

Figure 5A:
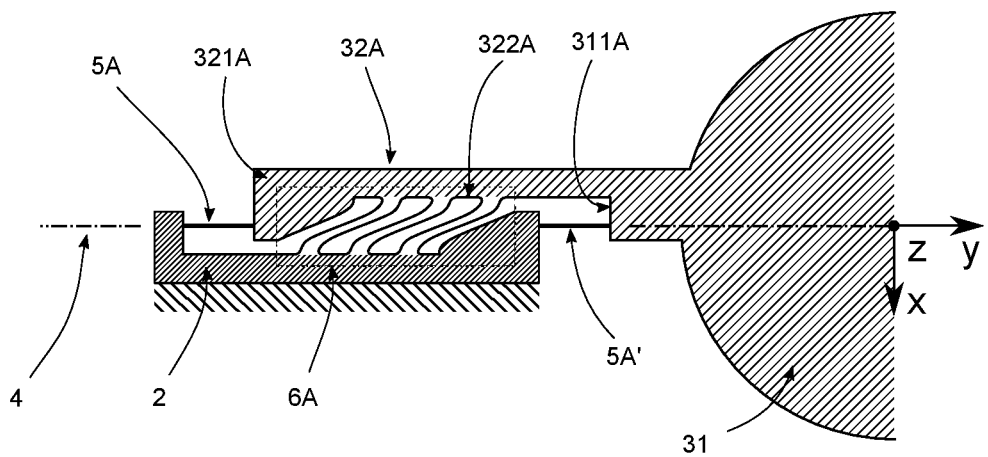
FIG. 5A shows in more detail an aspect of one of the embodiments of FIG. 2-4.

FIG. 5A zooms in on the plurality of torsion beams 6A. It shows the frame 2, in which the mirror body is rotationally suspended along the rotation axis 4. The mirror body consists of the central portion 31 and the first and second extension portions 32A and 32B integral therewith, the extension portions extending along the longitudinal axis (y). The extension portions are flexibly coupled to the frame by the plurality of torsion beams. The plurality of torsion beams 6A connects to the extension portion 32A at the lateral side of the extension portion 322A. In addition, the mirror body is flexibly coupled to the frame by the out-of-plane support beam units 5A and 5A'.

Figure 5B:
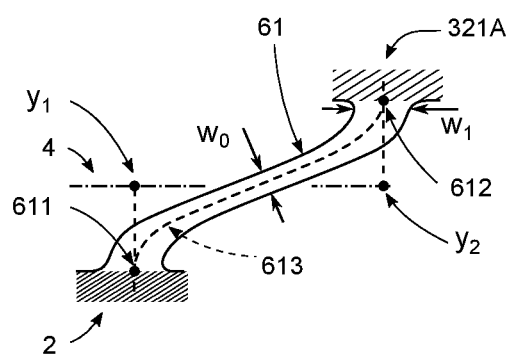
FIG. 5B shows a first feature of an element of FIG. 5A.
Figure 5C:
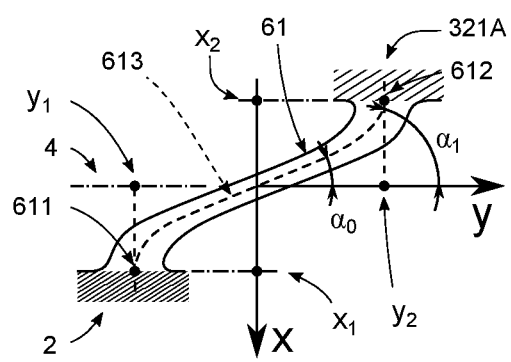
FIG. 5C shows a second feature of an element of FIG. 5A.

FIG. 5B and FIG. 5C zoom in again on a single torsion beam 61 of the plurality of torsion beams 6A and 6B. FIG. 5B shows a torsion beam 61, wherein the first and the second end 611, 612 of the torsion beams 61 have a width w1 that is larger than a width (w0) in a central portion of the torsion beams. In addition, FIG. 5B shows a center line 613 of torsion beam 61, and points y1 and y2 located at the longitudinal axis. These points y1, y2 indicate the mutually different positions of the first and second end points 611, 612 along the longitudinal axis. Finally, it is noted that FIG. 5B and FIG. 5C show that the first and second end points are at mutually opposite sides of the rotation axis 4. In FIG. 5C the x-coordinates of the end points 611 and 612 are denoted as respectively x1 and x2.

In addition to FIG. 5B, FIG. 5C illustrates the size of an angle α1, between the center line 613 at the end 612 of the torsion beam 61 and the longitudinal direction y, and the size of an angle α0, between the center line 613 at a central portion of the torsion beam 61 and the longitudinal direction y. In FIG. 5C, the size of the angle α1 is larger than the size of the angle α0, giving the central line of the torsion beam a slightly meandering shape. Additionally, in FIG. 5C the end segments of the center line near end points 611 and 612 are perpendicular to the longitudinal direction (y).

Figure 6A:
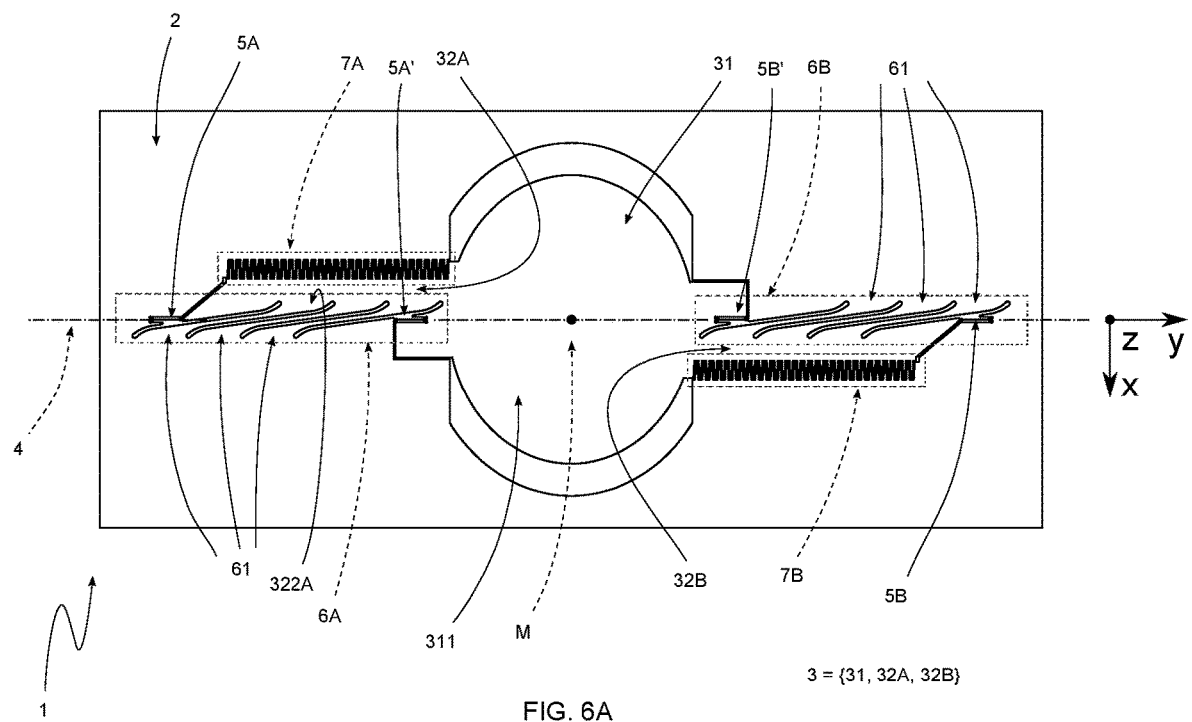
FIG. 6A is a top-view of a further embodiment of an improved MEMS-mirror device as disclosed herein.

FIG. 6A shows a more complete embodiment of an improved MEMS-mirror device 1. The improved MEMS-mirror device 1 comprises a support, such as a frame 2, a mirror body 3 (consisting of a central portion 31 and two extension portions 32A and 32B) that is rotationally suspended in the frame along a rotation axis 4, and an actuator 7A,7B to induce a rotation in the mirror body around the rotation axis.

The mirror body 3 has a mirror surface 311 that in a neutral state defines a reference plane (x, y) with a longitudinal axis (y) through a center of the mirror body parallel to the rotation axis 4 and with a lateral axis (x) transverse to the longitudinal axis.

As is further shown in FIG. 6A, the first and the second extension portion 32A, 32B are each flexibly coupled to the frame with a respective plurality 6A, 6B of torsion beams 61. The first extension portion 32A has the flexible coupling at a lateral side 322A. The actuator 7A is coupled to the extension portion at a side opposite to the aforementioned lateral side 322A. Finally, FIG. 6A shows the out-of-plane support units 5A, 5A', 5B, and 5B' which provide an additional flexible coupling between the mirror body 3 and the frame 2.

Figure 6B:
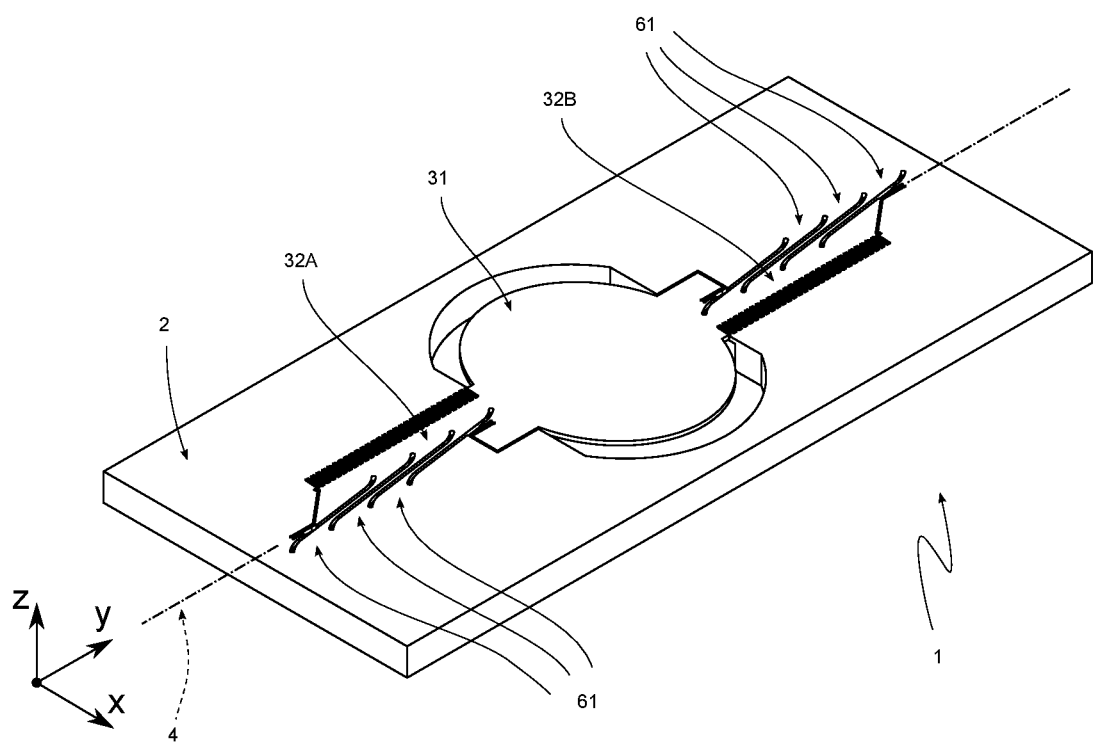
FIG. 6B is a perspective view of said further embodiment.

FIG. 6B shows an isometric 3D view of the same embodiment as FIG. 6A.

FIG. 7A to 7E show detailed cut-outs of the embodiment as depicted in FIG. 6A and FIG. 6B.

In FIG. 7A, especially noteworthy are the slits 81 to 86, which are typically etched into a layer of a silicon substrate to separate moving parts such as the mirror body 31 from stationary parts such as the frame 2. These slits also separate the torsion beams 61 from each other, thereby defining the size and shape of the torsion beams 61. In addition, FIG. 7A shows that the second extension portion 32B has the flexible coupling at the lateral side 322B facing in the negative x-direction, and the actuator 7B at the lateral side 323B facing in the positive x-direction. This figure also shows that the mirror body is further flexibly coupled to the frame 2 by support beam units 5B and 5B' that at least substantially extend in a longitudinal direction, and that the support beam units flexibly couple the peripheral end 321B of extension portions 32B to the frame 2 and the longitudinal side 311B of the central portion 31 of the mirror body with the frame 2.

FIG. 7B zooms in on the plurality of torsion beams 6B from FIG. 7A. It shows torsion beams 61, wherein the first end 611 and the second end 612 of the torsion beams 61 have a width w1 that is larger than a width w0 in a central portion of the torsion beams. In addition, FIG. 7B shows a center line 613 of torsion beam 61, and points y1 and y2 which indicate the mutually different positions of the first and second end points 611, 612 along the longitudinal axis. Finally, FIG. 7B shows the width w2 of the slits surrounding the torsion beams. The location and width of these slits define the width of the torsion beams. In exemplary embodiments the width w2 of the slits around the torsion beams is at least 5 micrometers. to facilitate forming the torsion beams in an etching process. Slits having a width w2 of at least 5 micron further renders possible a sufficient degree of freedom for the torsion beams also in case of a large rotation angle. However, if the width w2 is large, then the torsion beams will not be densely packed, which increases the contribution to inertia of the mirror body from the extension portions, which reduces the operating frequency and increases the sensitivity to shock and vibrations. It may also increase die size, which increases cost of the MEMS mirror device. Therefore, the width w2 of the slits is preferably less than twice the width w0 in a central portion of the torsion beams.

Figure 7C:
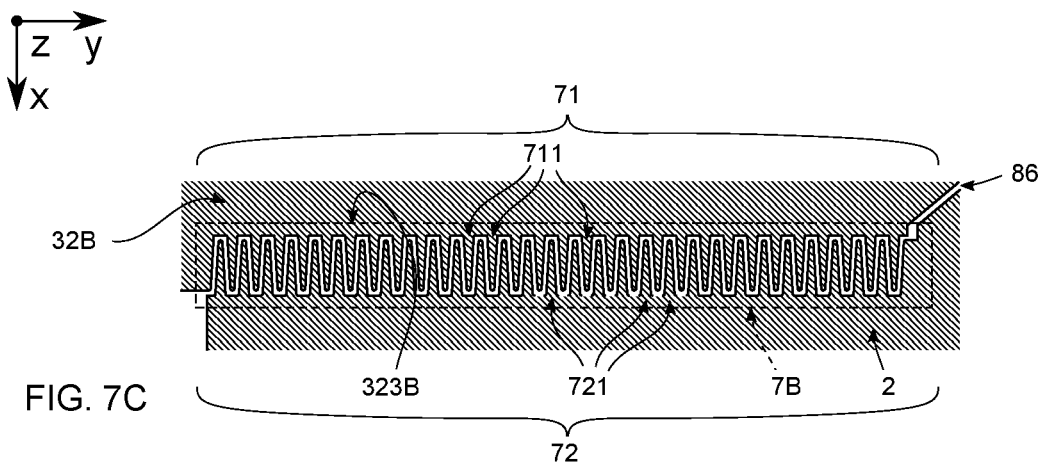
FIG. 7C shows another portion in further detail.

FIG. 7C shows a detailed view of one half of the actuator 7A and 7B. The actuator halve 7B comprises a comb actuator that is arranged at side 323B of the extension portion 32B. The comb actuator comprises a respective pair of mutually interdigitated combs comprising a first comb 71 being part of the respective extension portion 32B and a second comb 72 being part of the frame 2. The combs are mechanically separated and electrically isolated from each other by slit 86.

Figure 7D:
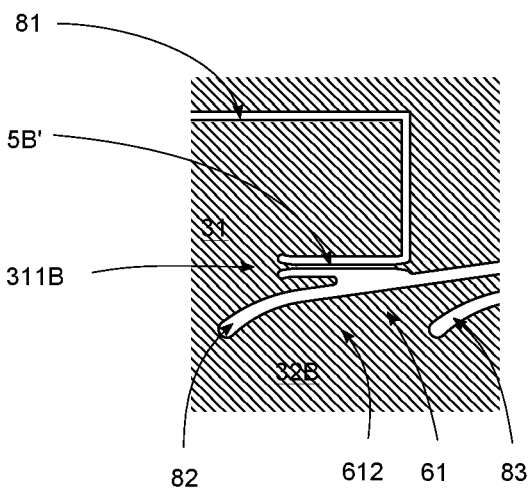
FIG. 7D shows in still further detail a sub-portion of FIG. 7B.

FIG. 7D shows a detailed view of the out-of-plane support beam unit 5B' which extends in a longitudinal direction, and which flexibly couples longitudinal side 311B of the central portion 31 of the mirror body with the frame 2.

Figure 7E:
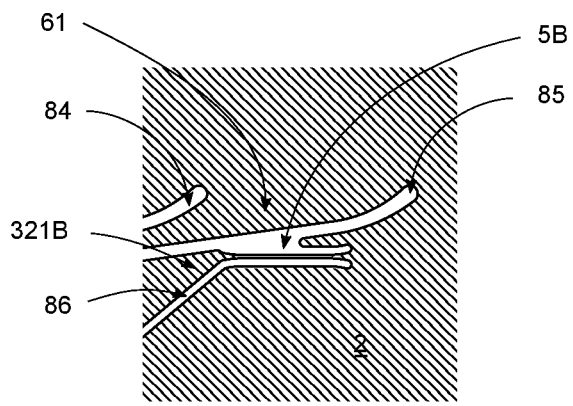
FIG. 7E shows in still further detail another sub-portion of FIG. 7B.

FIG. 7E shows a detailed view of the out-of-plane support beam unit 5B which extends in a longitudinal direction, and which flexibly couples the peripheral end 321B of extension portion 32B to the frame 2.

Figure 8A:
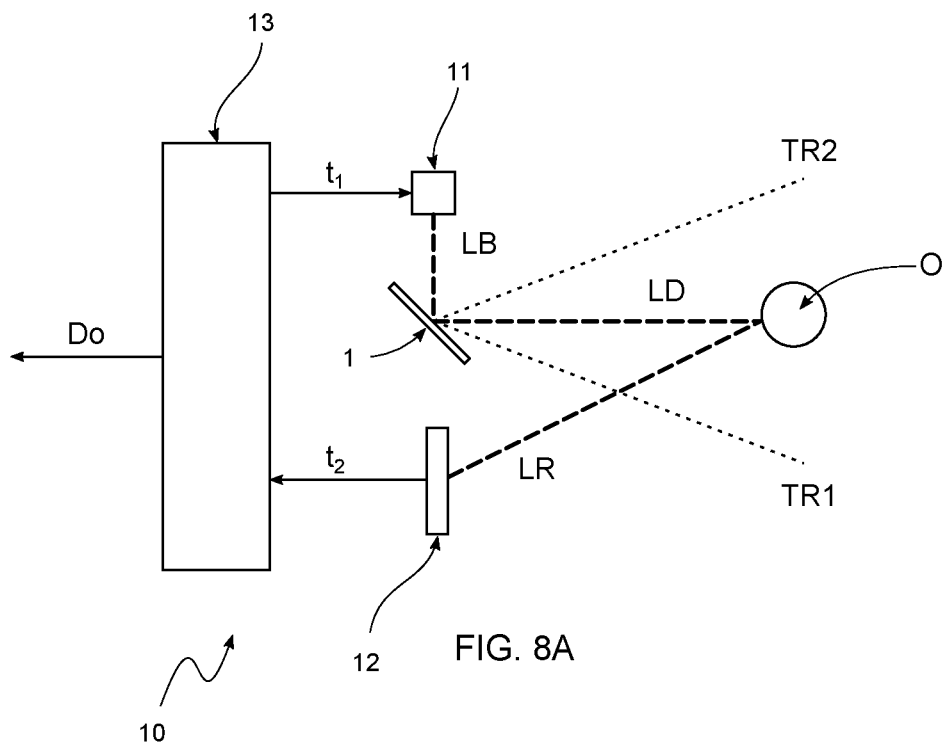
FIG. 8A shows a LIDAR-device provided with an improved MEMS-mirror device as disclosed herein.

FIG. 8A shows a light detection and ranging (LIDAR) device 10 comprising a laser 11 to generate a modulated laser beam LB, a MEMS-mirror device 1 to dynamically deflect the modulated laser beam within a target range TR, an optical sensor 12 to detect a reflected beam LR originating from a reflection of the dynamically deflected modulated laser beam LD at an object O in the target range TR, and a data processor 13 to determine a distance Do towards the object from a point in time t1 at which the modulated laser beam LB was generated, and a point in time t2 at which the reflection was detected by the optical sensor 12.

Figure 8B:
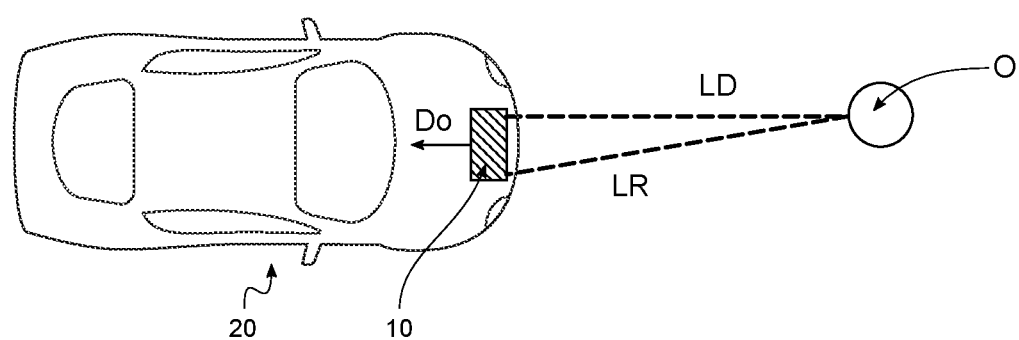
FIG. 8B shows a vehicle provided with the LIDAR-device of FIG. 8A.

FIG. 8B shows a vehicle 20 comprising a LIDAR device 10. It also shows an object O in the target range and a reflected beam LR originating from a reflection of the dynamically deflected modulated laser beam LD.

The invention claimed is:
1. A MEMS-mirror device comprising:
a support;
a mirror body that is rotationally suspended with respect to the support along a rotation axis, the mirror body having a mirror surface in a neutral state defining a reference plane having a longitudinal axis through a center of the mirror body parallel to the rotation axis and a lateral axis transverse to the longitudinal axis;
an actuator to induce a rotation in the mirror body around the rotation axis;
the mirror body having a central portion and having a first extension portion and a second extension portion that are integral with the central portion and that extend in mutually opposite directions along the longitudinal axis;

the first and the second extension portion each having a respective lateral side at which respective lateral side they are flexibly coupled to the support with a respective plurality of torsion beams which in a neutral state of the mirror body extend in the reference plane, the torsion beams of a respective plurality of torsion beams having a respective first end attached to the support and a respective second end attached to the respective extension portion, wherein the respective first end and the respective second end have mutually different positions in the direction of the longitudinal axis and in the lateral direction are at mutually opposite sides of the rotation axis.

2. The MEMS-mirror device according to claim 1, wherein the first and the second extension portion are each flexibly coupled with their respective plurality of torsion beams at the same lateral side to the support.

3. The MEMS-mirror device according to claim 1, wherein the first and the second extension portion are each flexibly coupled with their respective plurality of torsion beams at mutually opposite lateral sides to the support.

4. The MEMS-mirror device according to claim 1, wherein the mirror body is further flexibly coupled to the support by out-of-plane support beam units that at least substantially extend in a longitudinal direction, which out-of-plane support beam units comprise respective first out-of-plane support beam units that each flexibly couple a peripheral end of a respective one of the extension portions with the support and/or comprise respective second out-of-plane support beam units that flexibly couple a respective longitudinal side of the central portion of the mirror body with the support.

5. The MEMS-mirror device according to claim 2, wherein the mirror body is further flexibly coupled to the support by out-of-plane support beam units that at least substantially extend in a longitudinal direction, which out-of-plane support beam units comprise first out-of-plane support beam units that each flexibly couple a peripheral end of a respective one of the extension portions with the support and/or comprise second out-of-plane support beam units that each couple a respective longitudinal side of the central portion of the mirror body with the support, and wherein the out-of-plane support beam units are displaced laterally with respective to longitudinal axis in a direction away from a lateral side of the support where the first ends of the torsion beams are attached.

6. The MEMS-mirror device according to claim 1, wherein the first and the second end of the torsion beams have a width that is larger than a width in a central portion of the torsion beams.

7. The MEMS-mirror device according to claim 1, wherein the size of an angle with the longitudinal direction of a center line of a torsion beam at the first end and the second end is larger than that of the angle in a central portion of the torsion beam.

8. The MEMS-mirror device according to claim 1, wherein at least two torsion beams of a plurality of torsion beams are mutually different by one or more of a width, a length, a thickness or an angle.

9. The MEMS-mirror device according to claim 1, wherein a width in a central portion of a slit between two torsion beams of a plurality of torsion beams is smaller than twice the width in a central portion of the torsion beams.

10. The MEMS-mirror device according to claim 1, wherein the actuator comprises at each longitudinal side of the mirror body a respective comb actuator that is arranged at a side of the longitudinal axis opposite a side of said longitudinal axis with the first ends of the respective plurality of torsion beams, each comb actuator comprising a respective pair of mutually interdigitated combs comprising a first comb being part of the respective extension portion and a second comb being part of the frame.

11. A light detection and ranging, LIDAR, device comprising:
    a laser to generate a modulated laser beam;
    a MEMS-mirror device to dynamically deflect the modulated laser beam within a target range, the MEMS-mirror device comprising:
    a support;
    a mirror body that is rotationally suspended with respect to the support along a rotation axis, the mirror body having a mirror surface in a neutral state defining a reference plane having a longitudinal axis through a center of the mirror body parallel to the rotation axis and a lateral axis transverse to the longitudinal axis;
    an actuator to induce a rotation in the mirror body around the rotation axis;
    the mirror body having a central portion and having a first extension portion and a second extension portion that are integral with the central portion and that extend in mutually opposite directions along the longitudinal axis;
    the first and the second extension portion each having a respective lateral side at which respective lateral side they are flexibly coupled to the support with a respective plurality of torsion beams which in a neutral state of the mirror body extend in the reference plane, the torsion beams of a respective plurality of torsion beams having a respective first end attached to the support and a respective second end attached to the respective extension portion, wherein the respective first end and the respective second end have mutually different positions in the direction of the longitudinal axis and in the lateral direction are at mutually opposite sides of the rotation axis;
    an optical sensor to detect a reflected beam originating from a reflection of the dynamically deflected modulated laser beam at an object in the target range;
    a data processor to determine a distance towards the object based on a length of a time interval between a point in time at which the modulated laser beam was generated and a point in time at which the reflection thereof was detected by the optical sensor.

12. A vehicle comprising a LIDAR device as claimed in claim 11.

13. The MEMS-mirror device according to claim 2, wherein the mirror body is further flexibly coupled to the support by out-of-plane support beam units that at least substantially extend in a longitudinal direction, which out-of-plane support beam units comprise respective first out-of-plane support beam units that each flexibly couple a peripheral end of a respective one of the extension portions with the support and/or comprise respective second out-of-plane support beam units that flexibly couple a respective longitudinal side of the central portion of the mirror body with the support.

14. The MEMS-mirror device according to claim 3, wherein the mirror body is further flexibly coupled to the support by out-of-plane support beam units that at least substantially extend in a longitudinal direction, which outof-plane support beam units comprise respective first out-of-plane support beam units that each flexibly couple a peripheral end of a respective one of the extension portions with the support and/or comprise respective second out-of-plane support beam units that flexibly couple a respective longitudinal side of the central portion of the mirror body with the support.

15. The MEMS-mirror device according to claim 2, wherein the first and the second end of the torsion beams have a width that is larger than a width in a central portion of the torsion beams.

16. The MEMS-mirror device according to claim 3, wherein the first and the second end of the torsion beams have a width that is larger than a width in a central portion of the torsion beams.

17. The MEMS-mirror device according to claim 2, wherein the size of an angle with the longitudinal direction of a center line of a torsion beam at the first end and the second end is larger than that of the angle in a central portion of the torsion beam.

18. The MEMS-mirror device according to claim 3, wherein the size of an angle with the longitudinal direction of a center line of a torsion beam at the first end and the second end is larger than that of the angle in a central portion of the torsion beam.

19. The MEMS-mirror device according to claim 2, wherein at least two torsion beams of a plurality of torsion beams are mutually different by one or more of a width, a length, a thickness or an angle.

20. The MEMS-mirror device according to claim 3, wherein at least two torsion beams of a plurality of torsion beams are mutually different by one or more of a width, a length, a thickness or an angle.

* * * * *